United States Patent
Chae

(10) Patent No.: US 11,482,028 B2
(45) Date of Patent: Oct. 25, 2022

(54) VERIFICATION SYSTEM, VERIFICATION METHOD, AND INFORMATION STORAGE MEDIUM

(71) Applicant: Rakuten Group, Inc., Tokyo (JP)

(72) Inventor: Yeongnam Chae, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/357,408

(22) Filed: Jun. 24, 2021

(65) Prior Publication Data

US 2022/0100993 A1  Mar. 31, 2022

(30) Foreign Application Priority Data

Sep. 28, 2020 (JP) .............................. JP2020-162139

(51) Int. Cl.
| | |
|---|---|
| G06K 9/46 | (2006.01) |
| G06V 30/413 | (2022.01) |
| G06V 10/40 | (2022.01) |
| G06V 10/22 | (2022.01) |
| G06V 30/10 | (2022.01) |
| G06V 10/46 | (2022.01) |

(52) U.S. Cl.
CPC .......... *G06V 30/413* (2022.01); *G06V 10/225* (2022.01); *G06V 10/40* (2022.01); *G06V 10/467* (2022.01); *G06V 30/10* (2022.01)

(58) Field of Classification Search
CPC .... G06V 30/413; G06V 10/225; G06V 10/40; G06V 10/467; G06V 30/10; G06V 10/242; G06V 30/418
See application file for complete search history.

(56) References Cited

U.S. PATENT DOCUMENTS

| | | | | |
|---|---|---|---|---|
| 7,561,716 B2* | 7/2009 | Ho | ........................ | G06T 1/005 380/54 |
| 9,652,602 B2* | 5/2017 | King | ................... | G06V 10/993 |
| 9,754,164 B2* | 9/2017 | Macciola | ........... | G06K 9/00536 |

(Continued)

FOREIGN PATENT DOCUMENTS

| | | | |
|---|---|---|---|
| CN | 101208723 A | 6/2008 | |
| CN | 101193759 B * | 9/2014 | ............. B42D 25/00 |

(Continued)

OTHER PUBLICATIONS

Robust License-Plate Recognition Method for Passing Vehicles Under Outside Environment, Takashi Naito et al., IEEE, Nov. 2000, pp. 2309-2319 (Year: 2000).*

(Continued)

*Primary Examiner* — Jayesh A Patel
(74) *Attorney, Agent, or Firm* — Sughrue Mion, PLLC

(57) ABSTRACT

A transformed image generation unit 32 generates a transformed image by transforming an oblique image. A target region specifying unit 36 specifies a target region indicating the target in the front image based on a feature extracted from a typical portion of a document written on a target in a sample image and a feature extracted from at least a part of the front image. A verification unit 38 determines whether a target shown in the oblique image is the same as a target shown in the front image by verifying the target region in the front image and a region in the transformed image associated with the target region.

8 Claims, 12 Drawing Sheets

(56) References Cited

U.S. PATENT DOCUMENTS

| | | | |
|---|---|---|---|
| 9,760,788 B2* | 9/2017 | Shustorovich | G06V 30/414 |
| 10,515,266 B1* | 12/2019 | Jarvis | G06V 10/17 |
| 2008/0121708 A1* | 5/2008 | Rhoads | H04L 9/3278 |
| | | | 235/491 |
| 2008/0246759 A1 | 10/2008 | Summers | |
| 2009/0214105 A1 | 8/2009 | van den Berg | |
| 2013/0287265 A1* | 10/2013 | Nepomniachtchi | |
| | | | H04N 1/00708 |
| | | | 382/115 |
| 2014/0037184 A1* | 2/2014 | Gorski | G06V 30/274 |
| | | | 382/137 |
| 2016/0283787 A1* | 9/2016 | Nepomniachtchi | |
| | | | H04N 1/00734 |
| 2017/0316550 A1* | 11/2017 | Yahata | G06V 10/751 |
| 2018/0107887 A1* | 4/2018 | Huber, Jr. | G06V 10/225 |
| 2019/0213408 A1* | 7/2019 | Cali | G06V 30/245 |
| 2019/0294900 A1* | 9/2019 | Li | G06V 40/70 |
| 2020/0143162 A1 | 5/2020 | Zheng et al. | |
| 2020/0311844 A1* | 10/2020 | Luo | G06Q 50/265 |
| 2021/0064900 A1* | 3/2021 | Vorobiev | G06V 30/413 |
| 2021/0158036 A1* | 5/2021 | Huber, Jr. | G06V 30/413 |

FOREIGN PATENT DOCUMENTS

| | | | | |
|---|---|---|---|---|
| CN | 101193759 B | | 9/2014 | |
| CN | 105335702 A | * | 2/2016 | |
| CN | 108764033 A | * | 11/2018 | G06F 21/32 |
| CN | 108805800 A | * | 11/2018 | G06K 9/3208 |
| CN | 109034165 A | | 12/2018 | |
| CN | 107729847 B | | 8/2020 | |
| EP | 3 786 844 A1 | | 3/2021 | |
| EP | 3 796 218 A1 | | 3/2021 | |
| JP | 4169462 B2 | * | 10/2008 | G06T 3/4038 |
| JP | 2009122843 A | * | 6/2009 | |
| JP | 4807277 B2 | * | 11/2011 | |
| JP | WO2014103297 A1 | * | 1/2017 | |
| JP | 6148426 B1 | * | 6/2017 | G06K 9/3241 |
| JP | 6574921 B1 | * | 9/2019 | G06K 9/00456 |
| JP | 2020095681 A | * | 6/2020 | |
| WO | WO-2004088575 A1 | * | 10/2004 | A61B 18/1233 |
| WO | WO-2007087498 A2 | * | 8/2007 | G06F 16/211 |
| WO | WO-2015196084 A1 | * | 12/2015 | G06F 21/44 |
| WO | 2020/008628 A1 | | 1/2020 | |
| WO | 2020/008629 A1 | | 1/2020 | |
| WO | WO-2020008628 A1 | * | 1/2020 | G06K 9/00463 |
| WO | WO-2020008629 A1 | * | 1/2020 | G06K 9/00456 |

OTHER PUBLICATIONS

Comparison K-Nearest Neighbors (K-NN) and Artificial Neural Network (ANN) in Real Time Entrants Recognition, Christin Panjaitan at el., ISRITI, 2018, pp. 1-4 (Year: 2018).*

Personal Verification System Using ID Card and Face Photo, Adulwit Chinapas et al., IJOMLC, Aug. 2019, pp. 407-412 (Year: 2019).*

David G. Lowe, "Distinctive Image Features from Scale-Invariant Keypoints", International Journal of Computer Vision, Jan. 5, 2004, pp. 1-28.

* cited by examiner

FIG.5

| YAMADA TARO |
| June 23, 1980 |
| 1-2-3 ABCcity Tokyo |
| July 25, 2015 |
| July 25, 2020 |
| 1234 5678 9012 |

VERIFICATION SYSTEM, VERIFICATION METHOD, AND INFORMATION STORAGE MEDIUM

CROSS-REFERENCE TO RELATED APPLICATIONS

The present disclosure contains subject matter related to that disclosed in Japanese Priority Patent Application JP 2020-162139 filed in the Japan Patent Office on Sep. 28, 2020, the entire contents of which are hereby incorporated by reference.

BACKGROUND OF THE INVENTION

Field of the Invention

The present invention relates to a verification system, a verification method, and an information storage medium.

Description of the Related Art

Scale invariant feature transform (SIFT) which is a type of distinctive image feature quantity is described in "Distinctive Image Features from Scale-Invariant Keypoints" by David G. Lowe, International Journal of Computer Vision, 2004, Jan. 5, 2004.

There is known a technology of an electronic know your customer (eKYC) for performing know your customer of a user online based on an image of a know your customer document such as a driver license transmitted from the user via the Internet. WO 2020/008628 discloses a technology for accelerating image processing in electronic know your customer or the like using distinctive image feature quantities such as SIFT. WO 2020/008629 discloses a technology capable of improving accuracy of image processing in electronic know your customer or the like.

SUMMARY OF THE INVENTION

In electronic know your customer, a text string such as a name, an address, and a birth day described in a target is extracted by performing text recognition on an image of the original of the target such as a know your customer document. Then, the know your customer of a user is performed based on the extracted text string.

However, even when an illegal image such as an image obtained by imaging or scanning a copy of a target or a falsified or altered image is presented from a user rather than an image of the original of the target, the presented image may not be detected as the illegal image in the electronic know your customer in some cases.

The present invention has been devised in view of the problems and an objective of the present invention is to provide a verification system, a verification method, and a program capable of strictly performing electronic know your customer.

According to an aspect of the present invention, a verification system includes: a front image acquisition unit configured to acquire a front image indicating a state in which a written surface on which a document is written in a target is viewed in a front direction; an oblique image acquisition unit configured to acquire an oblique image indicating a state in which the written surface is viewed in an oblique direction; a transformed image generation unit configured to generate a transformed image indicating a state in which the target shown in the oblique image is viewed in the front direction by transforming the oblique image based on a feature extracted from at least a part of the front image and a feature extracted from at least a part of the oblique image; a region specifying unit configured to specify a target region indicating the target in the front image based on a feature extracted from a typical portion of a document written on a predetermined target in a sample image indicating a known region of the target and a feature extracted from at least a part of the front image; and a verification unit configured to determine whether a target shown in the oblique image is the same as a target shown in the front image by verifying the target region in the front image and a region in the transformed image associated with the target region.

In the verification system according to an aspect of the present invention, the region specifying unit may specify the target region after the transformed image generation unit generates the transformed image.

Alternatively, the transformed image generation unit may generate the transformed image after the region specifying unit specifies the target region.

In the verification system according to an aspect of the present invention, the transformed image generation unit may generate the transformed image by transforming the oblique image based on a feature extracted from the target region specified by the region specifying unit and a feature extracted from at least a part of the oblique image.

The verification system according to an aspect of the present invention may further include a thickness determination unit configured to determine whether a thickness of a target shown in the oblique image is thicker than a predetermined thickness based on the oblique image.

The verification system according to an aspect of the present invention may further include a text recognition unit configured to recognize text included in a document written in the target region.

According to another aspect of the present invention, a verification method includes: acquiring a front image indicating a state in which a written surface on which a document is written in a target is viewed in a front direction; acquiring an oblique image indicating a state in which the written surface is viewed in an oblique direction; generating a transformed image indicating a state in which the target shown in the oblique image is viewed in the front direction by transforming the oblique image based on a feature extracted from at least a part of the front image and a feature extracted from at least a part of the oblique image; specifying a target region indicating the target in the front image based on a feature extracted from a typical portion of a document written on a predetermined target in a sample image indicating a known region of the target and a feature extracted from at least a part of the front image; and determining whether a target shown in the oblique image is the same as a target shown in the front image by verifying the target region in the front image and a region in the transformed image associated with the target region.

According to still another aspect of the present invention, a non-transitory computer readable information storage medium storing a program which is to be executed by a computer to execute a program causes a computer to perform: a procedure of acquiring a front image indicating a state in which a written surface on which a document is written in a target is viewed in a front direction; a procedure of acquiring an oblique image indicating a state in which the written surface is viewed in an oblique direction; a procedure of generating a transformed image indicating a state in which the target shown in the oblique image is viewed in the front direction by transforming the oblique image based on a feature extracted from at least a part of the front image and a feature extracted from at least a part of the oblique image; a procedure of specifying a target region indicating the target in the front image based on a feature extracted from a typical portion of a document written on a predetermined target in a sample image indicating a known region of the target and a feature extracted from at least a part of the front image; and a procedure of determining whether a target shown in the oblique image is the same as a target shown in the front image by verifying the target region in the front image and a region in the transformed image associated with the target region.

BRIEF DESCRIPTION OF THE DRAWINGS

FIG. 5 is a diagram illustrating an example of extracted text data;

DETAILED DESCRIPTION OF THE INVENTION

Hereinafter, an embodiment of the present invention will be described in detail with reference to the drawings.

Figure 1:
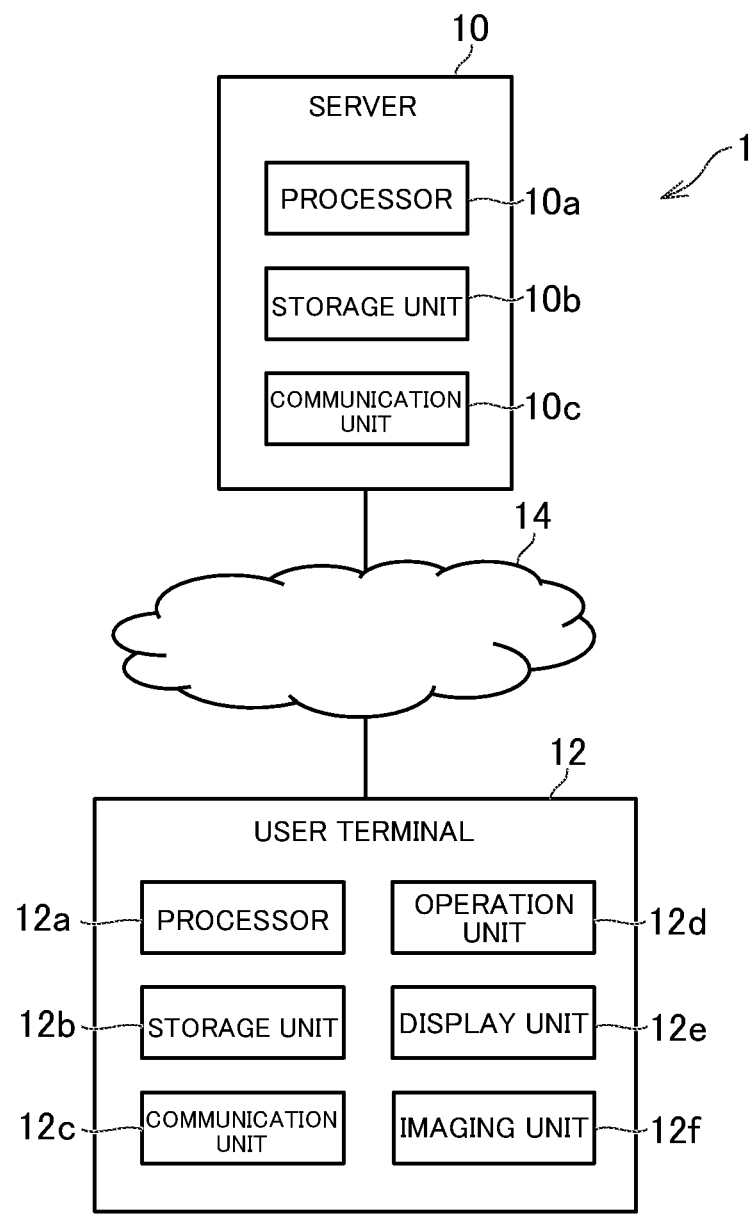
FIG. 1 is a diagram illustrating an example of an overall configuration of an image processing system according to an embodiment of the present invention.

FIG. 1 is a diagram illustrating an example of an overall configuration of an image processing system 1 according to an embodiment of the present invention. As illustrated in FIG. 1, the image processing system 1 according to the embodiment includes, for example, a server 10 and a user terminal 12. The server 10 and the user terminal 12 are connected to a computer network 14 such as the Internet. Therefore, the server 10 and the user terminal 12 can communicate with each other via the computer network 14. In FIG. 1, the number of servers 10 and the number of user terminals 12 are singular, but may be plural.

The server 10 is a computer system such as a server computer and includes, for example, a processor 10a, a storage unit 10b, and a communication unit 10c, as illustrated in FIG. 1.

The processor 10a is, for example, a program control device such as a microprocessor that operates in accordance with a program installed in the server 10. The storage unit 10b is, for example, a storage element such as a ROM or a RAM, or a solid-state drive (SSD). The storage unit 10b stores a program executed by the processor 10a, or the like. The communication unit 10c is, for example, a communication interface for wired communication or wireless communication and exchanges data with the user terminal 12 via the computer network 14.

The user terminal 12 is a computer that is operated by a user and is, for example, a mobile phone (including a smartphone), a portable information terminal (including a tablet computer), or a personal computer. As illustrated in FIG. 1, the user terminal 12 includes, for example, a processor 12a, a storage unit 12b, a communication unit 12c, an operation unit 12d, a display unit 12e, and an imaging unit 12f.

The processor 12a is, for example, a program control device such as a microprocessor that operates in accordance with a program installed in the user terminal 12. The storage unit 12b is, for example, a storage element such as a ROM or a RAM, or a solid-state drive (SSD). The storage unit 12b stores a program executed by the processor 12a, or the like. The communication unit 12c is, for example, a communication interface for wired communication or wireless communication and exchanges data with the server 10 via the computer network 14.

The operation unit 12d is an input device and includes, for example, a pointing device such as a touch panel or a mouse, or a keyboard. The operation unit 12d delivers operation content to the processor 12a. The display unit 12e is, for example, a liquid crystal display unit or an organic EL display unit. The imaging unit 12f includes at least one camera and includes, for example, a CMOS image sensor or a CCD image sensor. The imaging unit 12f captures a still image or a moving image and generates image data. In the embodiment, the imaging unit 12f included in the user terminal 12 will be described. However, the imaging unit 12f may be provided outside of the user terminal 12.

The program and the data stored in the storage units 10b and 12b in description may be supplied from another computer via a network. A hardware configuration of the server 10 and the user terminal 12 is not limited to the foregoing example and various hardware can be applied. For example, the server 10 or the user terminal 12 may include a reading unit (for example, an optical disc drive or a memory card slot) that reads a computer-readable information storage medium or an input/output unit (for example, a USB port) that inputs and outputs data to and from an external device. For example, the program or the data stored in the information storage medium may be supplied to the server 10 or the user terminal 12 via the reading unit or the input/output unit.

In the embodiment, a user images an image of a target such as a know your customer document with the imaging unit 12f and uploads the captured image to the server 10 via the Internet to open a bank account, make an insurance contract, or the like.

The know your customer document may be a document with which the user can be checked and is, for example, a driver license, an insurance certificate, a resident card, or a passport. In the following description, the know your customer document according to the embodiment is assumed to be a driver license. For the driver license, there are various formats for each nation or district. To facilitate description, a driver license with a fictional format will be exemplified.

Figure 2:
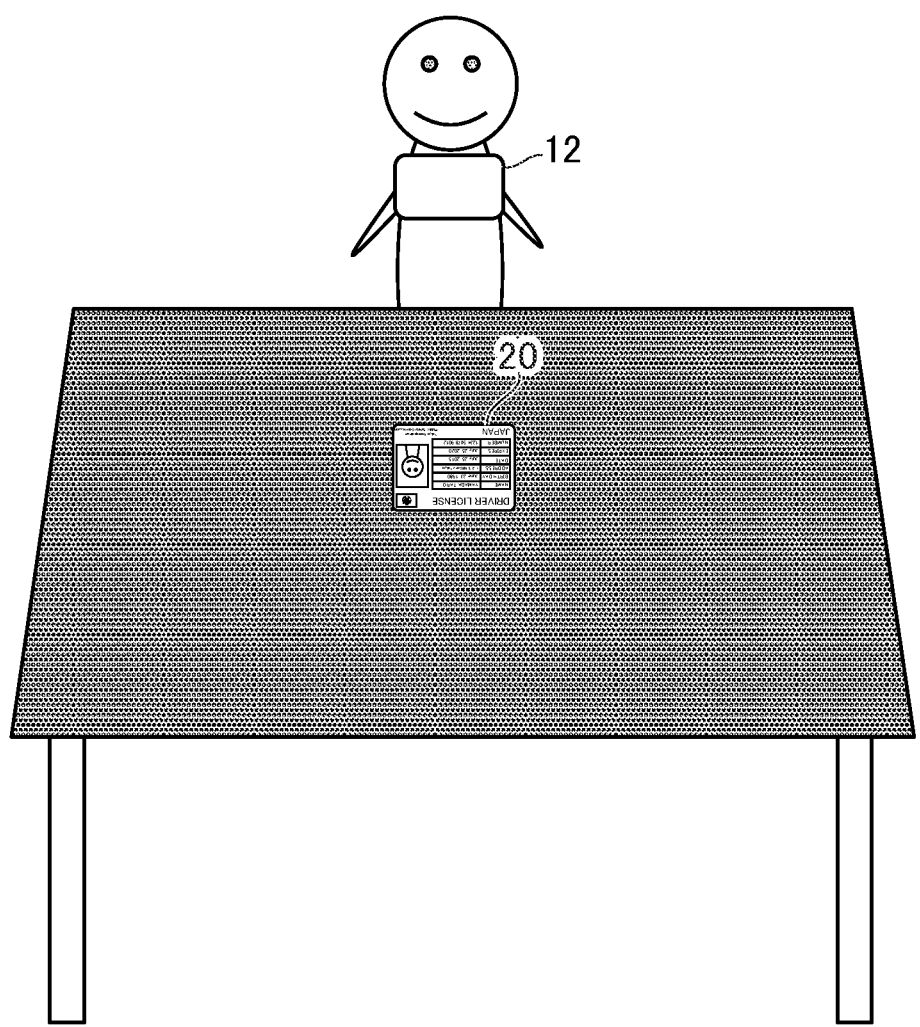
FIG. 2 is a diagram illustrating an example of a state in which a driver license is imaged.
Figure 3:
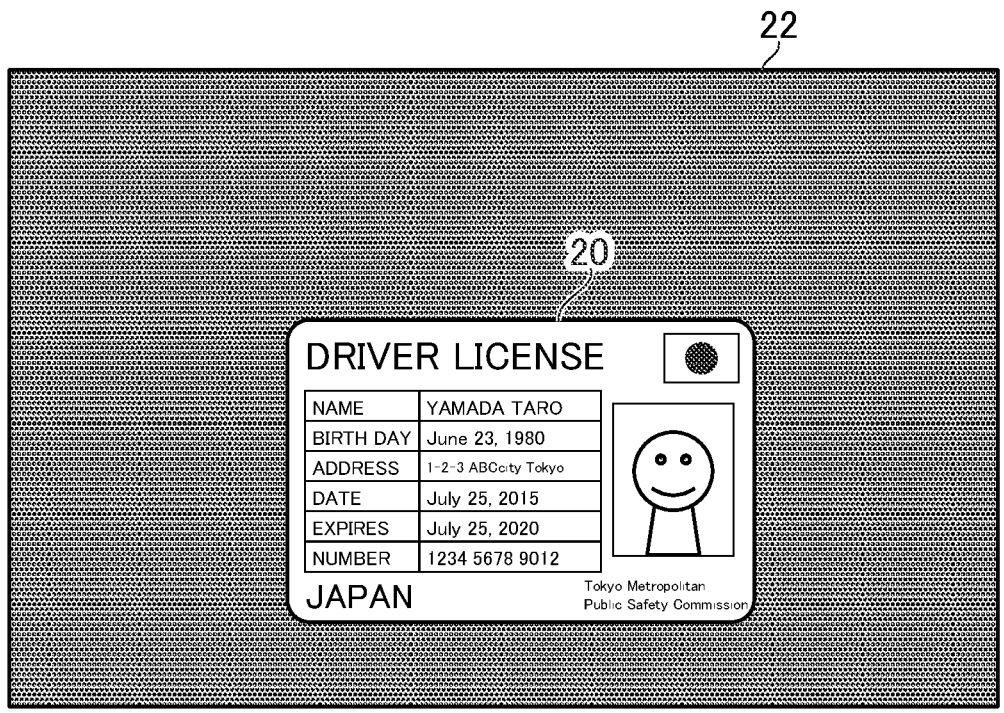
FIG. 3 is a diagram illustrating an example of a front image.
Figure 4:
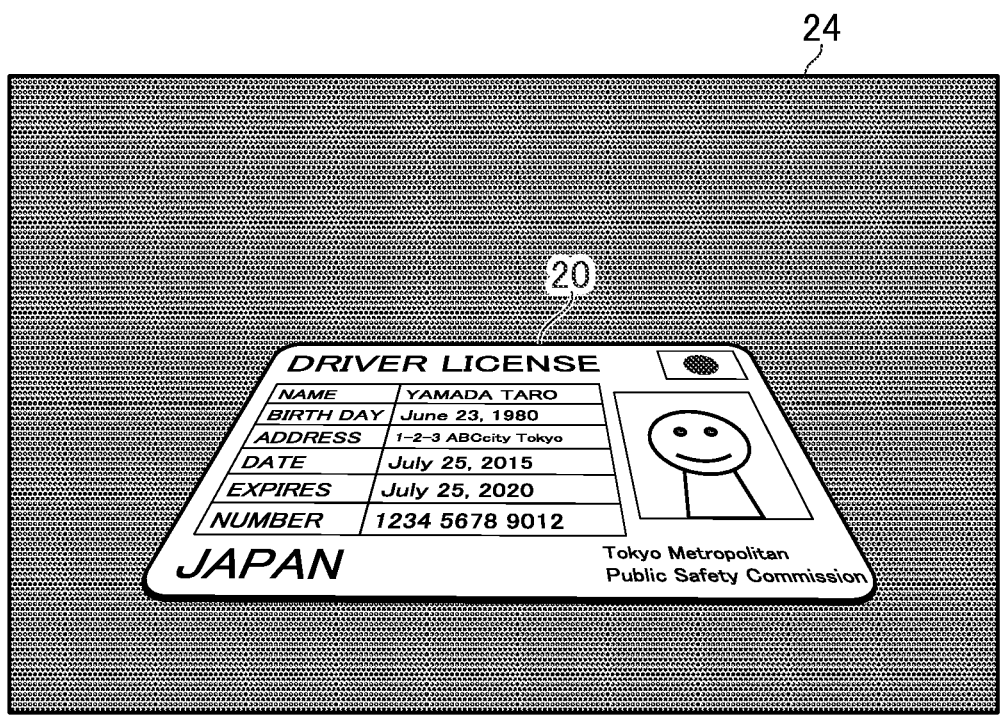
FIG. 4 is a diagram illustrating an example of an oblique image.

FIG. 2 is a diagram illustrating an example of a state in which a driver license 20 is imaged. As illustrated in FIG. 2, for example, the user uses the imaging unit 12f of the user terminal 12 to image the driver license 20 on a desk. In the embodiment, when the user images the driver license 20 substantially at the front position (right above), a front image 22 exemplified in FIG. 3 is captured by the imaging unit 12f. When the user images the driver license 20 obliquely, an oblique image 24 exemplified in FIG. 4 is captured by the imaging unit 12f. In the embodiment, a resolution of the front image 22 or the oblique image 24 is guaranteed to the degree that optical text recognition is possible and the driver license 20 is focused by the imaging unit 12f.

The user terminal 12 according to the embodiment uploads the front image 22 and the oblique image 24 captured by the imaging unit 12f to the server 10.

The server 10 performs electronic know your customer (eKYC) using the uploaded front image 22 and the uploaded oblique image 24.

For example, the server 10 performs optical text recognition on the front image 22 and extracts text such as a name, an address, and a birth day printed on the target. FIG. 5 is a diagram illustrating an example of extracted text data indicating text extracted from the front image 22 illustrated in FIG. 3.

The server 10 uses a learned machine learning model to determine whether the driver license 20 has some thickness shown in the oblique image 24, here, for example, whether the thickness is thicker than a predetermined thickness.

The server 10 determines whether a target shown in the front image 22 is the same as a target shown in the oblique image 24 by verifying the front image 22 and the oblique image 24.

In the electronic know your customer, an illegal image such as an image obtained by copying or scanning the driver license 20 or a falsified or altered image is presented from a user rather than an image of the original of the driver license 20 in some cases. In these cases, in the electronic know your customer, it may not be detected that the presented image is the illegal image.

In the embodiment, the electronic know your customer can be strictly performed by performing the electronic know your customer using the front image 22 and the oblique image 24 obtained by the same target.

Hereinafter, a function of the server 10 and a process executed by the server 10 according to the embodiment will be further described.

Figure 6:
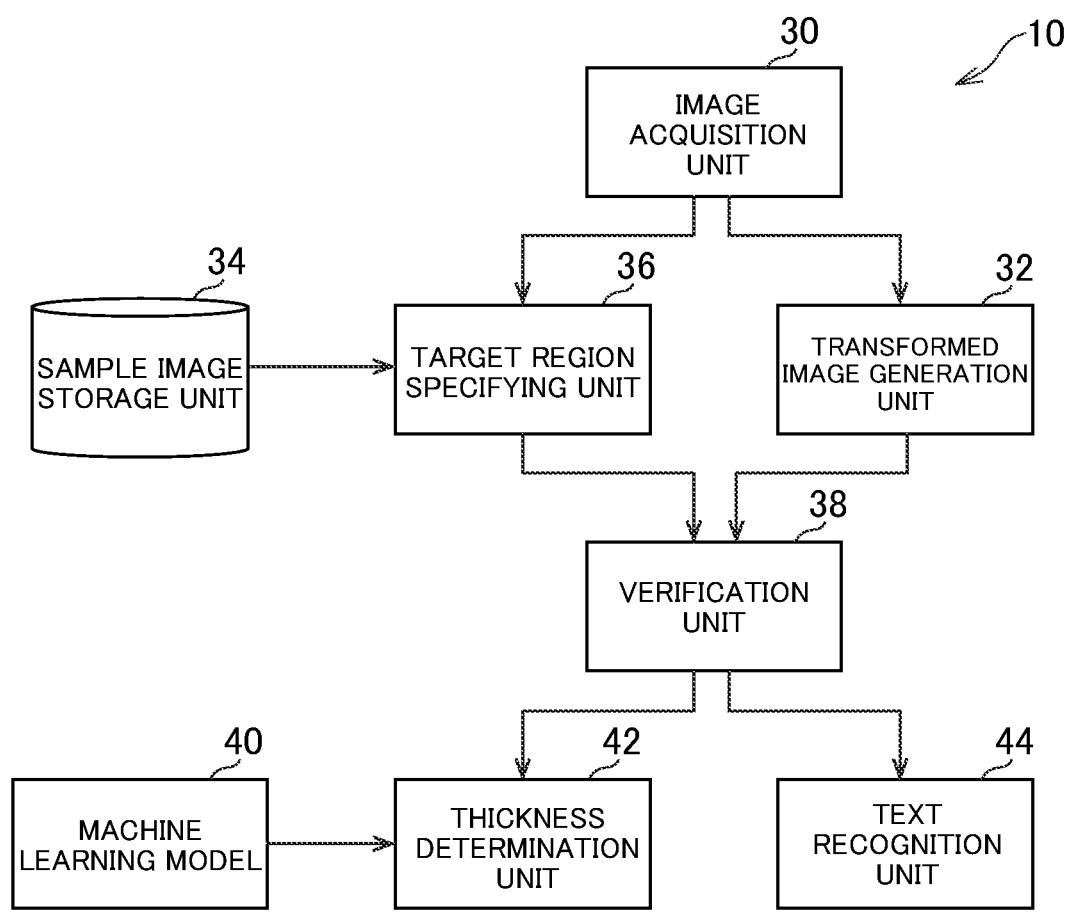
FIG. 6 is a functional block diagram illustrating an example of a function of a server according to an embodiment of the present invention.

FIG. 6 is a functional block diagram illustrating an example of a function implemented by the server 10 according to the embodiment. The server 10 according to this embodiment does not need to implement all of the functions illustrated in FIG. 6, and may also implement other functions than those illustrated in FIG. 6.

As illustrated in FIG. 6, the server 10 according to the embodiment functionally includes, for example, an image acquisition unit 30, a transformed image generation unit 32, a sample image storage unit 34, a target region specifying unit 36, a verification unit 38, a machine learning model 40, a thickness determination unit 42, and a text recognition unit 44. The image acquisition unit 30 is implemented mainly by the communication unit 10c. The transformed image generation unit 32, the target region specifying unit 36, the verification unit 38, the thickness determination unit 42, and the text recognition unit 44 are implemented mainly by the processor 10a. The sample image storage unit 34 is implemented mainly by the storage unit 10b. The machine learning model 40 is implemented mainly by the processor 10a and the storage unit 10b.

The functions given above are implemented in this embodiment by the processor 10a of the server 10 which is a computer by executing a program that is installed in the server 10 and includes commands corresponding to the above-mentioned functions. This program is supplied to the server 10 via a computer-readable information storage medium such as an optical disc, a magnetic disk, magnetic tape, a magneto-optical disk, or a flash memory, or via a computer network such as the Internet.

The image acquisition unit 30 acquires, for example, a front image 22 indicating a state in which a written surface on which a document is written in a target such as a know your customer document is viewed in a front direction in the embodiment. The image acquisition unit 30 acquires, for example, a front image 22 transmitted from the user terminal 12. The front image 22 according to the embodiment may not necessarily be an image indicating a state in which the written surface is strictly viewed at the front position, and suffices to represent a state in which the written surface is substantially viewed at the front position to the degree that optical text recognition is possible.

A document according to the embodiment is assumed to have a predetermined format and a layout is assumed to be determined in advance. That is, for the document, what is depicted where is assumed to be known in advance.

The document according to the embodiment is assumed to include a typical portion and an atypical portion. The typical portion is a portion in which content is fixed and is a portion common to other documents. In other words, the typical portion is a portion in which content is not changed irrespective of documents and is a portion in which content is not changed irrespective of users. For example, the typical portion is a format portion in a document and is a portion in which specific text, signs, figures, enclosing lines, an illustrate, or an image is depicted. The typical portion can also be a portion including information unique to a document.

In the example of FIG. 3, a title such as "DRIVER LICENSE" is an example of the typical portion. Item names such as "NAME", "BIRTH DAY", "ADDRESS", "DATE", "EXPIRES", and "NUMBER" are examples of the typical portion. A name of country such as "JAPAN" is an example of the typical portion. A name of an institution such as "Tokyo Metropolitan Public Safety Commission" is an example of the typical portion. The typical portion is not limited to the foregoing text. An image indicating the national flag of Japan in the driver license 20 in FIG. 3 is an example of the typical portion. An enclosing line that encloses the foregoing item name is also an example of the typical portion.

The atypical portion is a portion in which content is not fixed and is a portion in which content is not common to another document. In other words, the atypical portion is a portion in which content is changed for each document and is a portion in which content is changed for each user. For example, the atypical portion is a portion other than a format portion in a document and is a portion in which information such as personal information such as identification information or an attribute of a user is printed. The atypical portion can also be a portion including information unique to the user.

In the example of FIG. 3, a name "YAMADA TARO" is an example of the atypical portion. A birth day "Jun. 23, 1980" is an example of the atypical portion. An address "1-2-3 ABC City Tokyo" is an example of the atypical portion. An issue date "Jul. 25, 2015" is an example of the atypical portion. An expire date "Jul. 25, 2020" is an example of the atypical portion. A license number "1234 5678 9012" is an example of the atypical portion. The atypical portion is not limited to the foregoing text. A face photo of the user in the driver license 20 of FIG. 3 is also an example of the atypical portion. In addition, when information indicating a physical feature or an ID of the user is included in the driver license 20, the information is also an example of the atypical portion.

In the embodiment, the image acquisition unit 30 acquires, for example, the oblique image 24 indicating a state in which the written surface is viewed in an oblique direction. The image acquisition unit 30 acquires, for example, the oblique image 24 transmitted from the user terminal 12.

Figure 7:
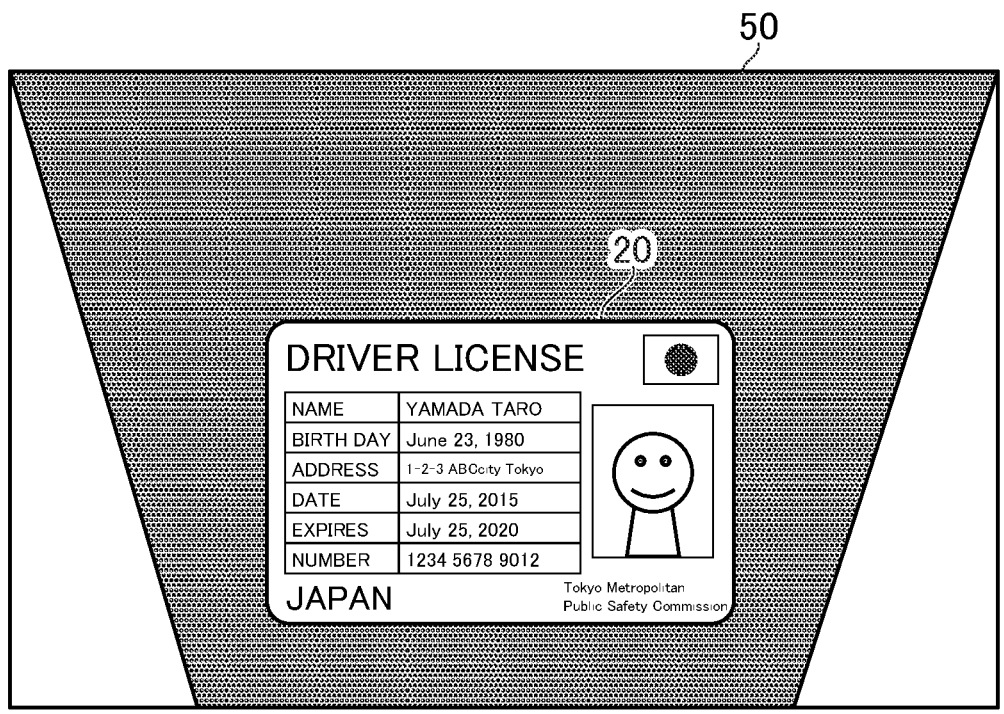
FIG. 7 is a diagram illustrating an example of a transformed image.

In the embodiment, the transformed image generation unit 32 generates a transformed image 50 indicating a state in which a target shown in the oblique image 24 is viewed in the front direction, as exemplified in FIG. 7, for example, by transforming the oblique image 24. The transformed image generation unit 32 generates the transformed image 50 exemplified in FIG. 7, for example, by transforming the oblique image 24 based on a feature extracted from at least a part of the front image 22 and a feature extracted from at least a part of the oblique image 24.

Here, the extracted feature is, for example, an image feature quantity extracted using an algorithm such as SIFT, SURF, or A-KAZE implemented in OpenCV and includes positional coordinates of a plurality of feature points and feature quantities of the feature points. The feature quantities are, for example, numerical values output from the above-described algorithm and are numerical values obtained by digitizing features of colors or a distinctive shape of an object.

For example, the transformed image generation unit 32 extracts a feature point group from each of the whole front image 22 and the whole oblique image 24 by using the above-described algorithm. The transformed image generation unit 32 extracts about tens to thousands or more of feature points from the front image 22 and the oblique image 24.

With regard to feature points in the front image 22, the transformed image generation unit 32 performs matching of the feature point group by specifying feature points in the oblique image 24 corresponding to the feature points in the front image 22. In the matching, feature points with similar feature quantities may be associated with each other. The similarity of the feature quantities means that the values of the feature quantities are similar and a difference between the feature quantities is small (for example, the difference is the minimum). In this matching, the feature points in the front image 22 are associated with the feature points in the oblique image 24.

The transformed image generation unit 32 calculates a transformation matrix based on a matching result of the feature point group. The transformation matrix is calculated so that the position of each feature point in the oblique image 24 is close to the position of the feature point of a matching part in the front image 22. As a method of acquiring the transformation matrix, any of various methods can be used. For example, a calculation expression of a transformation matrix in affine transformation, linear transformation, or projection transformation may be used.

The transformed image generation unit 32 generates the transformed image 50 by transforming the oblique image 24 based on the transformation matrix. As illustrated in FIG. 7, a document shown in the transformed image 50 is roughly similar to a document shown in the front image 22 illustrated in FIG. 3.

The feature point group may be extracted from the entire image, but may be extracted from a partial region.

Here, a case in which the feature point group is used is exemplified herein. The transformed image generation unit 32 may transform the oblique image 24 based on information which is a feature of an image, or information other than the feature point group may be used.

A transformation scheme for the oblique image 24 is not limited to affine transformation, linear transformation, or projection transformation. In the transformation of the oblique image 24, rotation, scaling, or movement maybe used. Some or all of affine transformation, linear transformation, projection transformation, rotation, scaling, and movement may be combined.

Figure 8:
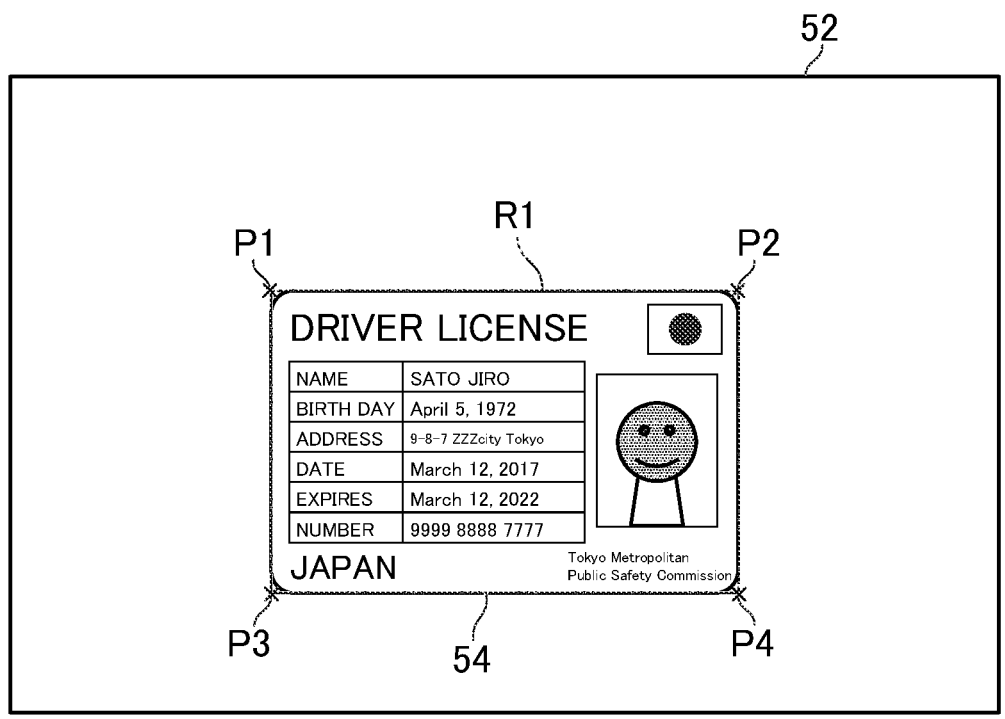
FIG. 8 is a diagram illustrating an example of a sample image.

The sample image storage unit 34 stores, for example, a sample image 52 illustrated in FIG. 8 in the embodiment. The sample image 52 according to the embodiment is an image in which there is no distorted curve or substantially no distorted curve of a document written on a written surface. In other words, the sample image 52 is an image in which a document is captured in a front direction or in a substantial front direction. The front direction is a direction of which an angle formed with the written surface of the document is perpendicular or may be directly opposite. The substantial front direction is a direction of which the angle is substantially perpendicular and is, for example, a direction of which the angle is equal to or greater than 80 degrees. The format of the sample image 52 is the same as the format of the front image 22. Therefore, a typical portion of the sample image 52 is the same as a typical portion of the front image 22 and an atypical portion of the sample image 52 is different from an atypical portion of the front image 22. The sample image 52 may not include atypical portion. That is, the sample image 52 may have only a format portion.

As illustrated in FIG. 8, in the sample image 52, the shape of the rounded quadrangular driver license 54 is maintained and the sample image 52 has no distortion or substantially no distortion. The direction of the driver license 54 is not shifted and there is no curve or substantially no curve. Therefore, text of the sample image 52 is not distorted or curved and is appropriate for optical text recognition. For example, the sample image 52 is prepared in advance by a manager of the image processing system 1. For example, the manager generates the sample image 52 by capturing a target on which a document is written with an imaging device or an image reading device such as a scanner and registers the sample image 52 in the sample image storage unit 34.

The background of the sample image 52 is preferably, for example, monochrome such as black or white.

The sample image 52 according to the embodiment is an image in which a predetermined target (for example, the driver license 54 herein) is shown in a known region. Hereinafter, this region is referred to as a sample target region R1. That is, a position, a shape, and a size of the sample target region R1 in the sample image 52 are known in advance. The sample target region R1 according to the embodiment is a rectangular region enclosing the driver license 54 shown in the sample image 52. Sample target region data indicating the sample target region R1 is stored in advance in the sample image storage unit 34. The sample target region data is, for example, data indicating coordinate values of vertexes (for example, four vertexes P1, P2, P3, and P4 herein) of the sample target region R1.

Figure 9:
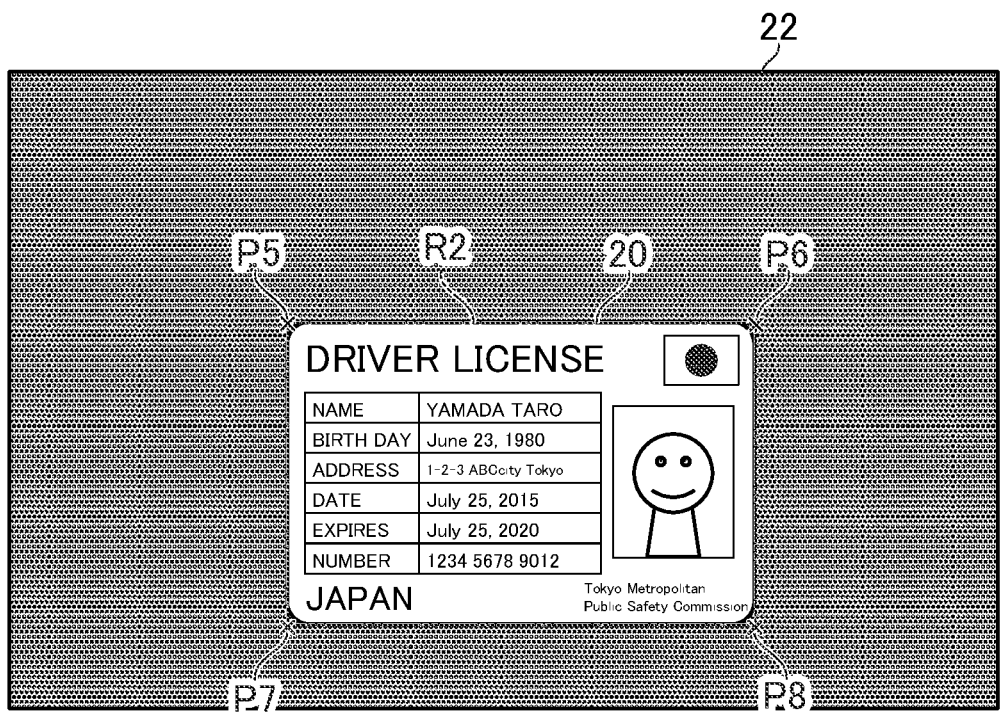
FIG. 9 is a diagram illustrating an example of a front image.

The target region specifying unit 36 specifies a region in which the target is shown in the front image 22, for example, in the embodiment. As illustrated in FIG. 9, hereinafter, this region is referred to as a front target region R2 in some cases. The target region specifying unit 36 specifies the front target R2, illustrated in FIG. 9, for example, based on a feature extracted from the typical portion of the document written in the target in the sample image 52 and a feature extracted from at least a part of the front image 22.

Here, the extracted feature is, as described above, an image feature quantity extracted using an algorithm such as SIFT, SURF, or A-KAZE implemented in OpenCV. The extracted feature includes positional coordinates of a plurality of feature points and feature quantities of the feature points. The feature quantities are, for example, numerical values output from the above-described algorithm and are numerical values obtained by digitizing features of colors or a distinctive shape of an object.

For example, with regard to the feature points of the typical portion extracted from the sample image 52, the target region specifying unit 36 matches the feature point group by specifying the feature points in the front image 22 corresponding to the feature points of the typical portion. Through this matching, the feature points in the typical portion of the sample image 52 are associated with the feature points in the front image 22.

The target region specifying unit 36 specifies the front target region R2 in the front image 22 corresponding to the sample target region R1 based on the matching result and the sample target region data stored in the sample image storage unit 34. For example, the target region specifying unit 36 specifies coordinate values of vertexes (in the example of FIG. 9, four vertexes P5, P6, P7, and P8) of the front target region R2 in the front image 22. The quadrangular front target region R2 according to the embodiment may not be rectangular. For example, when the front image 22 is not in a state in which the written surface is strictly viewed at the front position, the front target region R2 is not rectangular.

Figure 10:
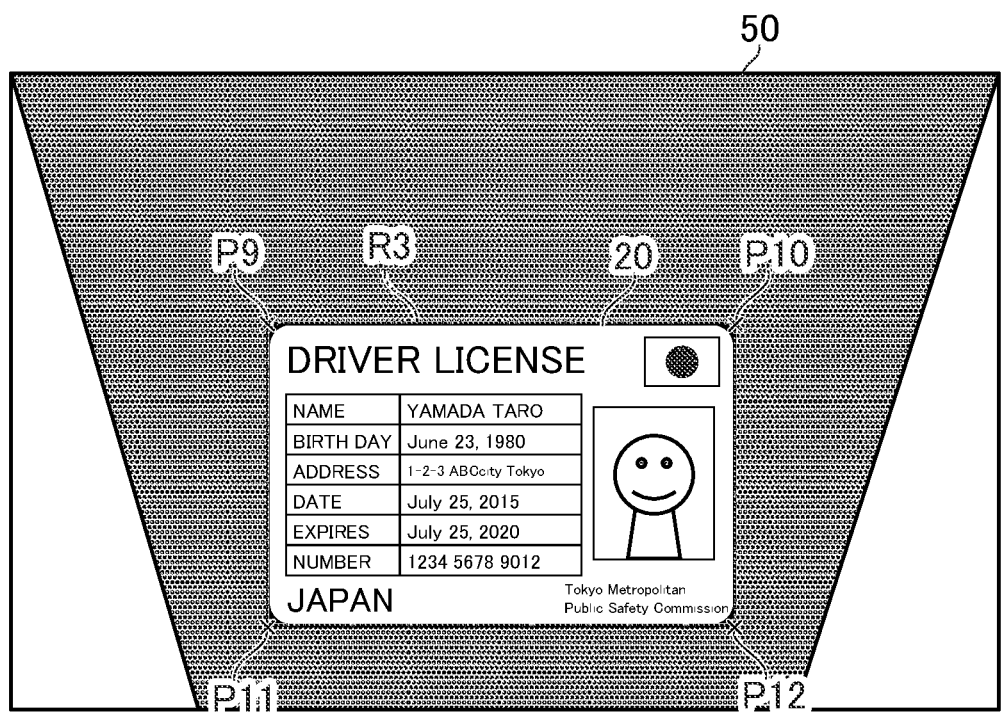
FIG. 10 is a diagram illustrating an example of a transformed image.

In the embodiment, the target region specifying unit 36 specifies, for example, a region (a transformed target region R3 illustrated in FIG. 10) in the transformed image 50 associated with the front target region R2 in the front image 22. In the embodiment, for example, by disposing the front image 22 and the transformed image 50 on the same coordinate system, it is possible to specify the transformed target region R3 in the transformed image 50 associated with the front target region R2 in the front image 22. Here, for example, the coordinate values of vertexes (in the example of FIG. 10, four vertexes P9, P10, P11, and P12) of the transformed target region R3 are specified. The quadrangular transformed target region R3 according to the embodiment may not be rectangular as in the front target region R2.

In the embodiment, the verification unit 38 determines whether the target shown in the oblique image 24 is the same as the target shown in the front image 22, for example, by verifying the front target region R2 in the front image 22 and the transformed target region R3 in the transformed image 50.

In the embodiment, for example, the shape and the size of the front target region R2 match the shape and the size of the transformed target region R3. Thus, with regard to the pixels in the front target region R2, and thus the pixels in the transformed target region R3 associated with these pixels can be specified. For example, with regard to the pixels in the front target region R2, differences between pixel values of the pixels and pixel values of the pixels in the transformed target region R3 associated with these pixels are calculated. Then, a sum of the differences of the pixel values calculated for the pixels in the front target region R2 is calculated.

The verification unit 38 determines that the target shown in the oblique image 24 is the same as the target shown in the front image 22 when the calculated sum is less than a predetermined value. Otherwise, the verification unit 38 determines that the target shown in the oblique image 24 is not the same as the target shown in the front image 22.

In the embodiment, the verification unit 38 may verify an image of the face of the user shown in the front image 22 and an image of the face of the user shown in the transformed image 50 (perform face authentication) in addition to the above-described texture matching. When the calculated sum of the differences of the pixel values is less than the predetermined value and the face authentication is successful, it may be determined that the target shown in the oblique image 24 is the same as the target shown in the front image 22. When the calculated sum of the differences of the pixel values is not less than the predetermined value or the face authentication fails, it may be determined that the target shown in the oblique image 24 is not the same as the target shown in the front image 22.

Here, when it is determined that the target shown in the oblique image 24 is not the same as the target shown in the front image 22, the verification unit 38 may notify the user of a request for re-uploading the front image 22 and the oblique image 24.

Figure 11:
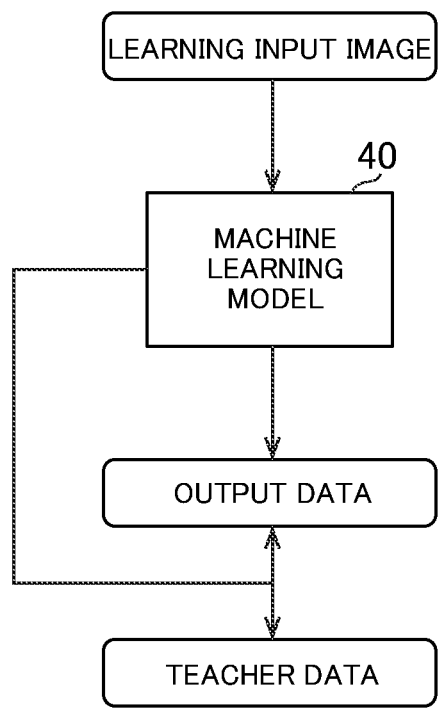
FIG. 11 is a diagram schematically illustrating an example of learning of a machine learning model.

The machine learning model 40 is, for example, a machine learning model such as a convolutional neural network (CNN) in the embodiment. In the embodiment, for example, it is assumed that the manager of the image processing system 1 performs learning of the machine learning model 40 in advance. As illustrated in FIG. 11, for example, in the embodiment, a plurality of pieces of training data including learning input images and teacher data are prepared in advance. The learning input images are, for example, images obtained by obliquely imaging various objects, such as images obtained by capturing the original of a target such as a driver license in the oblique direction or images obtained by capturing a thin sheet in the oblique direction.

For example, teacher data (for example, teacher data with a value of 1) indicating a positive example is associated with the learning input image obtained by capturing the original of the target. Conversely, teacher data (for example, teacher data with a value of 0) indicating a negative example is associated with a learning input image obtained by capturing an object which is not the original of the target. In this way, a plurality of pieces of training data including the learning input image and teacher data associated with the learning input image are generated.

Then, learning of the machine learning model 40 is performed using output data which is an output when the learning input image included in the training data is input to the machine learning model 40. Here, for example, differences between output data which is an output upon inputting the learning input image included in the training data to the machine learning model 40 and the teacher data included in the training data may be specified. Supervised learning in which values of parameters of the machine learning model 40 are updated may be performed based on the specified differences using a scheme such as back propagation method.

The machine learning model 40 may not necessarily be the above-described classification model and may be a regression model. In this case, values of teacher data or output data may indicate the thickness of a target.

In the embodiment, the thickness determination unit 42 determines whether the thickness of the target shown in the oblique image 24 is thicker than a predetermined thickness based on, for example, the oblique image 24. Here, for example, when it is determined that the target shown in the oblique image 24 is the same as the target shown in the front image 22, the thickness determination unit 42 may perform the determination.

Here, for example, the machine learning model 40 is assumed to be the above-described classification model. In this case, when an output upon inputting the oblique image 24 to the learned machine learning model 40 is "1," it is determined that the thickness of the target shown in the oblique image 24 is thicker than the predetermined thickness. When an output upon inputting the oblique image 24 to the learned machine learning model 40 is "0," it is determined that the thickness of the target shown in the oblique image 24 is thinner than the predetermined thickness.

For example, the machine learning model 40 is assumed to be the above-described regression model. In this case, when an output upon inputting the oblique image 24 to the learned machine learning model 40 is equal to or greater than a predetermined value, it is determined that the thickness of the target shown in the oblique image 24 is thicker than the predetermined thickness. When the output upon inputting the oblique image 24 to the learned machine learning model 40 is less than a predetermined value, it is determined that the thickness of the target shown in the oblique image 24 is thinner than the predetermined thickness.

Here, when it is determined that the thickness of the target shown in the oblique image 24 is thinner than the predetermined thickness, the thickness determination unit 42 may notify the user of a request for re-uploading the front image 22 and the oblique image 24.

In the embodiment, the text recognition unit 44 recognizes text included in the document written in the front target region R2 through, for example, optical text recognition or the like. The text recognition unit 44 generates, for example, the extracted text data exemplified in FIG. 5.

Here, an example of a flow of a process executed by the server 10 according to the embodiment will be described with reference to the flowchart exemplified in FIG. 12.

First, the image acquisition unit 30 receives the front image 22 exemplified in FIG. 3 and the oblique image 24 illustrated in FIG. 4 from the user terminal 12 (S101).

Then, the transformed image generation unit 32 generates the transformed image 50 exemplified in FIG. 7 by transforming the oblique image 24 based on the front image 22 and the oblique image 24 received in the process of S101 (S102).

Then, the target region specifying unit 36 specifies the front target region R2 in the front image 22 based on the sample image 52 exemplified in FIG. 8, the sample target region data, and the front image 22 received in the process of S101 (S103).

Then, the target region specifying unit 36 specifies the transformed target region R3 in the transformed image 50 generated in the process of S102 which corresponds to the front target region R2 specified in the process of S103 (S104).

Then, the verification unit 38 performs the verification process to determine whether the target shown in the oblique image 24 received in the process of S101 is the same as the target shown in the front image 22 received in the process of S101 (S105). Here, for example, the determination is performed based on the pixel values of the pixels in the front target region R2 specified in the process of S103 and the pixel values of the pixels in the transformed target region R3 specified in the process of S104.

Then, based on the oblique image 24 received in the process of S101, the thickness determination unit 42 performs a thickness determination process of determining whether the thickness of the target shown in the oblique image 24 is thicker than the predetermined thickness (S106).

Then, the text recognition unit 44 performs a text recognition process of recognizing text included in the document written in the front target region R2 specified in the process of S103 through the optical text recognition or the like to generate the extracted text data exemplified in FIG. 5 (S107). Then, the process in the exemplary process ends.

Figure 12:
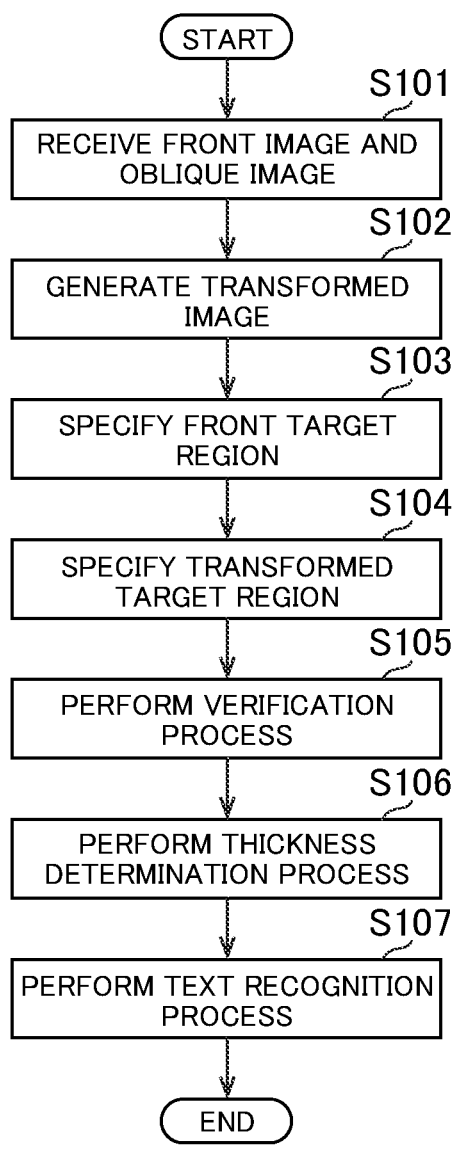
FIG. 12 is a flowchart illustrating an example of a flow of a process executed in the server according to an embodiment of the present invention.

In the process illustrated in FIG. 12, as illustrated in S102 and S103, after the transformed image generation unit 32 generates the transformed image 50, the target region specifying unit 36 specifies the front target region R2. Here, an order of the process of S102 and the process of S103 may be reversed. The transformed image generation unit 32 may generate the transformed image 50 after the target region specifying unit 36 specifies the front target region R2.

In this case, the transformed image generation unit 32 may generate the transformed image 50 by transforming the oblique image 24 based on the feature extracted from the front target region R2 specified by the target region specifying unit 36 and the feature extracted from at least a part of the oblique image 24. In this way, since the number of feature points used for the matching is narrowed down than when the feature points are extracted from the entire front image 22, the transformed image 50 can be generated with a processing load less than in the process of S102 in FIG. 12.

In the embodiment, as described above, in the electronic know your customer, it is checked that the target shown in the oblique image 24 has some thickness and the target shown in the front image 22 is the same as the target shown in the oblique image 24. In this way, according to the embodiment, it is possible to strictly check that the user owns the original of the target. As a result, the electronic know your customer can be more strictly performed.

In accordance with images, backgrounds, the sizes of regions in which targets are shown, methods of causing ambient light to arrive, colors, and brightness are various. For example, a background on which the front image 22 is captured is different from a background on which the oblique image 24 is captured in some cases. Therefore, even though the front image 22 and the oblique image 24 are simply combined, it may not be accurately determined whether the target shown in the front image 22 is the same as the target shown in the oblique image 24.

In the embodiment, as described above, since the front target region R2 specified based on the sample image 52 is combined with the transformed target region R3, it can be accurately determined whether the target shown in the front image 22 is the same as the target shown in the oblique image 24.

The present invention is not limited to the above-described embodiments.

For example, role sharing of the server 10 and the user terminal 12 is not limited to the above description. For example, some or all of the functions illustrated in FIG. 6 may be implemented by the user terminal 12.

The front image 22 is not necessarily captured by the imaging unit 12f and may be read by a scanner.

The foregoing specific text string or numeral values and the specific text strings and numeral values in the drawings are exemplary and the present invention is not limited to these text strings or numerical values.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A verification system comprising:
   at least one processor; and
   at least one memory device storing instructions which, when executed by the at least one processor, cause the at least one processor to perform operations comprising:
   acquiring a front image indicating a state in which a written surface on which a document is written in a target is viewed in a front direction;
   acquiring an oblique image indicating a state in which the written surface is viewed in an oblique direction;
   generating a transformed image indicating a state in which the target shown in the oblique image is viewed in the front direction by transforming the oblique image based on a feature extracted from at least a part of the front image and a feature extracted from at least a part of the oblique image;
   specifying a target region indicating the target in the front image based on a feature extracted from a typical portion of a document written on a predetermined target in a sample image indicating a known region of the target and a feature extracted from at least a part of the front image; and
   determining whether a target shown in the oblique image is the same as a target shown in the front image by verifying the target region in the front image and a region in the transformed image associated with the target region.

2. The verification system according to claim 1, wherein specifying the target region after generating the transformed image.

3. The verification system according to claim 1, wherein generating the transformed image after specifying the target region.

4. The verification system according to claim 3, wherein the generating comprises generating the transformed image by transforming the oblique image based on a feature extracted from the target region specified by the specifying and a feature extracted from at least a part of the oblique image.

5. The verification system according to claim 1, wherein the operations further comprise:
   determining whether a thickness of a target shown in the oblique image is thicker than a predetermined thickness based on the oblique image.

6. The verification system according to claim 1, wherein the operations further comprise:
   recognizing text included in a document written in the target region.

7. A verification method comprising:
   acquiring a front image indicating a state in which a written surface on which a document is written in a target is viewed in a front direction;
   acquiring an oblique image indicating a state in which the written surface is viewed in an oblique direction;
   generating a transformed image indicating a state in which the target shown in the oblique image is viewed in the front direction by transforming the oblique image based on a feature extracted from at least a part of the front image and a feature extracted from at least a part of the oblique image;
   specifying a target region indicating the target in the front image based on a feature extracted from a typical portion of a document written on a predetermined target in a sample image indicating a known region of the target and a feature extracted from at least a part of the front image; and
   determining whether a target shown in the oblique image is the same as a target shown in the front image by verifying the target region in the front image and a region in the transformed image associated with the target region.

8. A non-transitory computer readable information storage medium storing a program which is to be executed by a computer to execute:
   a procedure of acquiring a front image indicating a state in which a written surface on which a document is written in a target is viewed in a front direction;
   a procedure of acquiring an oblique image indicating a state in which the written surface is viewed in an oblique direction;
   a procedure of generating a transformed image indicating a state in which the target shown in the oblique image is viewed in the front direction by transforming the oblique image based on a feature extracted from at least a part of the front image and a feature extracted from at least a part of the oblique image;
   a procedure of specifying a target region indicating the target in the front image based on a feature extracted from a typical portion of a document written on a predetermined target in a sample image indicating a known region of the target and a feature extracted from at least a part of the front image; and
   a procedure of determining whether a target shown in the oblique image is the same as a target shown in the front image by verifying the target region in the front image and a region in the transformed image associated with the target region.

* * * * *